July 18, 1933.  W. NOBLE  1,919,033
VEHICLE SUSPENSION
Filed March 10, 1927  3 Sheets-Sheet 1
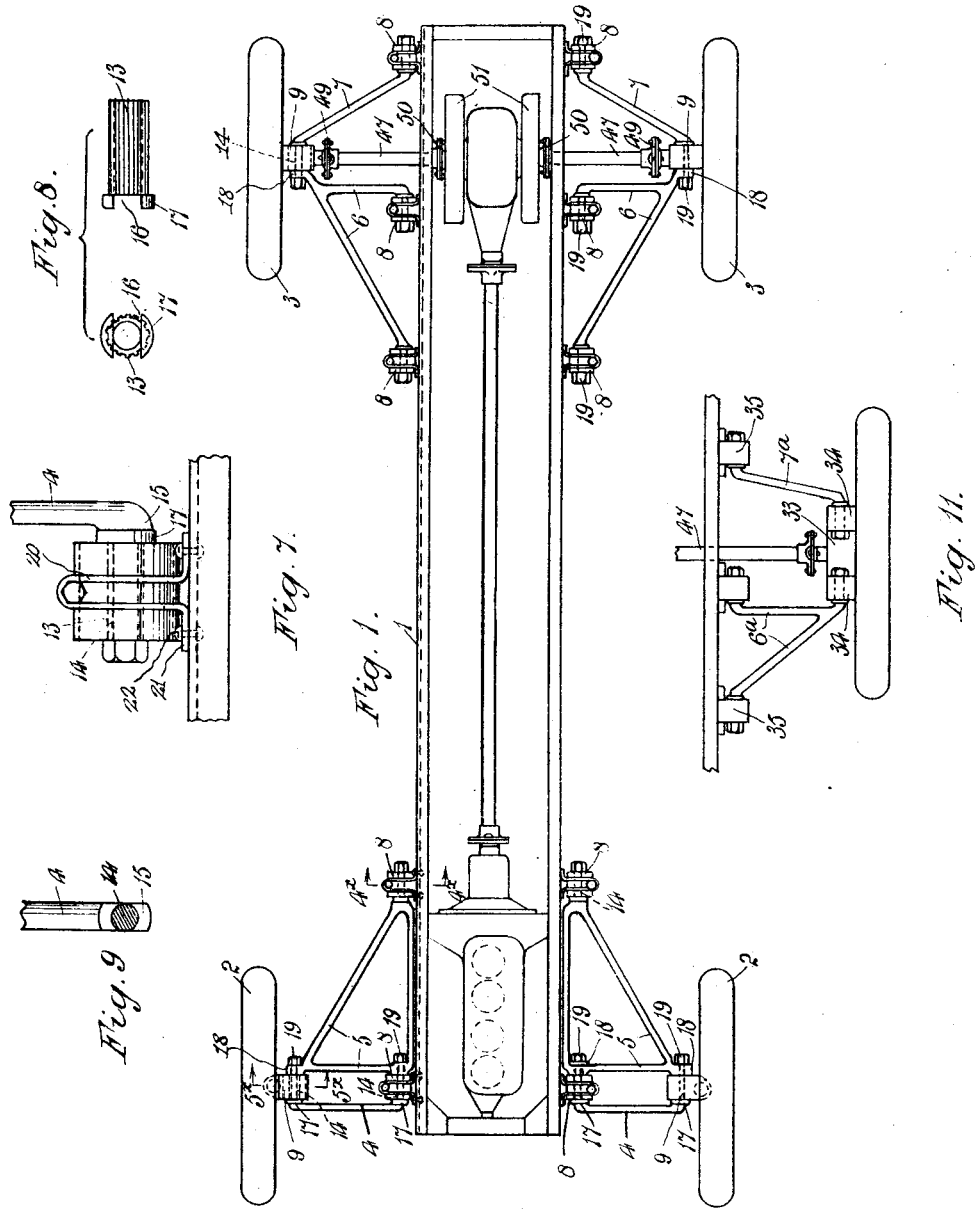
INVENTOR
Warren Noble
BY
ATTORNEY

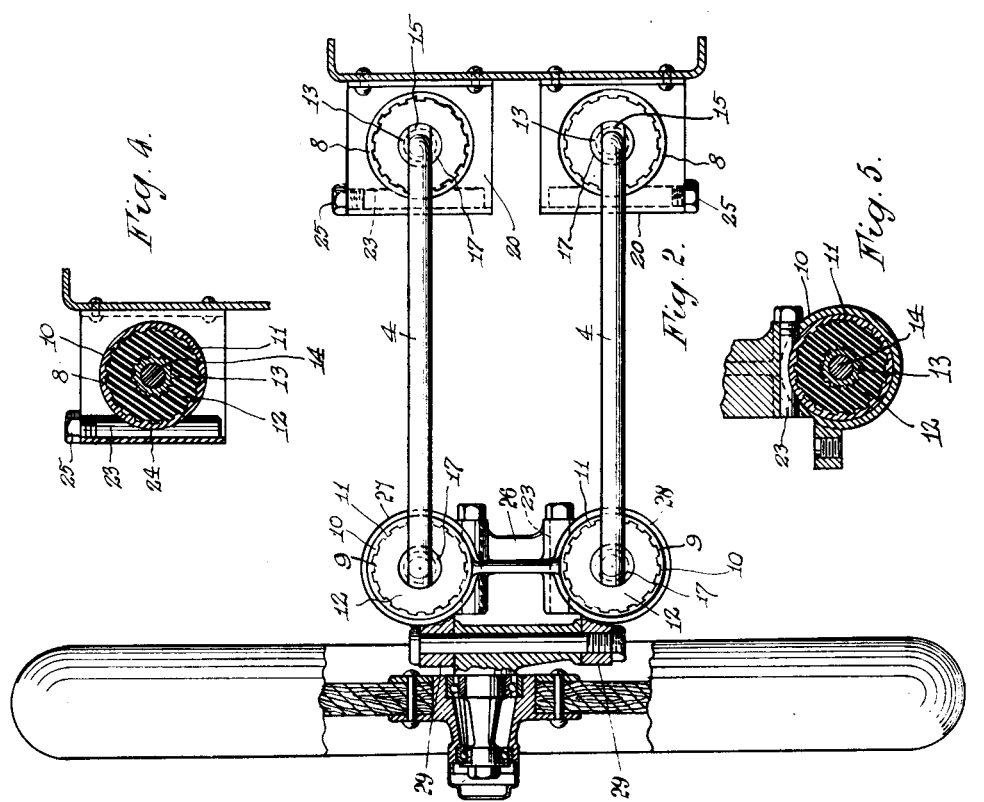

July 18, 1933.  W. NOBLE  1,919,033
VEHICLE SUSPENSION
Filed March 10, 1927  3 Sheets-Sheet 3
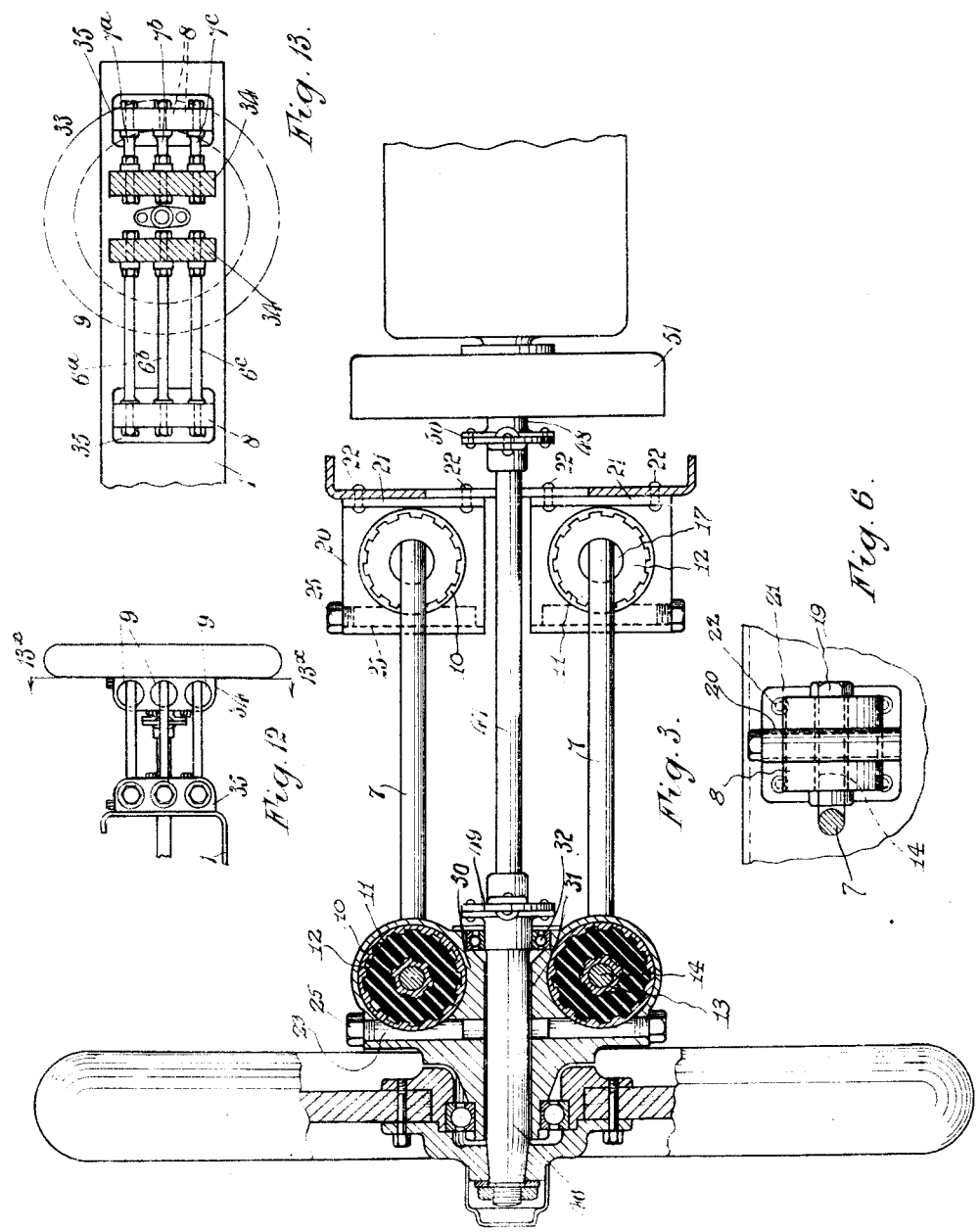

Patented July 18, 1933

1,919,033

UNITED STATES PATENT OFFICE

WARREN NOBLE, OF DETROIT, MICHIGAN

VEHICLE SUSPENSION

Application filed March 10, 1927. Serial No. 174,292.

This invention has for its object to provide a substitute for the ordinary type of metal spring suspension common in vehicle construction, and to avoid many of the disadvantages attending the use of such metal springs such as noise, liability to breakage, necessity of lubrication, excess weight, and so forth.

Generally, the invention contemplates the utilizing of the yielding torsional resistance of resilient bodies and more particularly to bodies formed of rubber compounds (hereinafter referred to in the general sense as "rubber"), as a means of controlling the movements of suspensory levers and also the yielding resistance to compression of said bodies for the further absorbing of shocks or vibration.

Still further, the invention contemplates the provision, as a spring or suspension device, of a casing enclosing a rubber core and a central member embedded in said core rotatable somewhat relative to said casing against the torsional resistance of said rubber, whereby said device may be employed as a resilient connection between relatively movable structures by employing a swingable arm or lever and utilizing said device as the fulcrum member of said lever or as a fulcrum member in a link system yieldingly resisting the flexion of said system.

A further object of the invention is to utilize the self damping function of rubber subjected to torsion whereby the necessity for auxiliary damping means in vehicle suspension is rendered in most cases, unnecessary and a highly desirable shock absorbing condition attained.

Still further, the said invention provides for the eliminating of axles additional to the suspension means, the said suspension means being incorporated in a structure performing the functions of an axle, whereby a resilient axle structure is obtained. Saving in weight of a vehicle and decreased cost of production in many cases, are possible by the use of the improved suspension means.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide a suitable torsion resisting member having suitable qualities of resiliency and strength, such as a cylindrical block of rubber, with an outer enclosing casing and an inner axially connected member, and link said casing and said axial member between the relatively movable frame and wheel structures of a vehicle by such means that relative rotation of said casing and axial member results from such movement of the said frame and wheel structures, whereby the resulting torsional strain on the said torsion member yieldingly resists the said relative movement of said frame and said wheel structure. All of which is more particularly described and ascertained hereinafter, by way of example, having reference to the accompanying drawings, wherein:—

Figure 1 is a plan view of a vehicle chassis illustrative of an embodiment of the said invention;

Figure 2 is an enlarged sectional detail of the forward suspension means of the chassis showing the same partly in elevation and partly in section;

Figure 3 is a similar view of the rear suspension means;

Figure 4 is a cross section of one of the torsion resisting devices taken on the line $4^x$—$4^x$, Figure 1;

Figure 5 is a similar cross section taken on the line $5^x$—$5^x$, Figure 1;

Figure 6 is a detail elevation of a torsion resisting device held by a sheet metal fitting to the frame of the vehicle;

Figure 7 is a plan of the same;

Figure 8 shows in end and side elevation a bushing for the mounting of the end of a suspension lever or link within said torsion member;

Figure 9 illustrates partly in cross section, the end portion of a suspension lever showing shoulders for engaging said bushing;

Figure 10 is a perspective view of a locking pin for securing a torsion member casing in its support;

Figure 11 is a detail plan view illustrating a modified arrangement of rear suspension;

Figure 12 is an elevation of the same;

Figure 13 is a section on the line 13ˣ—13ˣ, Figure 12;

Figure 14 is a detail in elevation showing a further modified arrangement; and

Figure 15 is a view similar to that of Figure 14 showing a still further modification.

Similar characters of reference indicate similar parts in the several Figures of the drawings.

1, 2 and 3 represent the frame structure, front wheel structures, and rear wheel structures, respectively, of an automobile, the said frame structure being connected to and supported from the wheels by means of links or levers 4, 5, 6 and 7 hingedly mounted at their inner or frame ends in torsion spring members generally numbered 8, and at their outer or wheel ends in similar torsion spring members generally numbered 9.

Each of these torsion spring members includes a cylindrical casing 10, which may be longitudinally ribbed as at 11 on its inner surface, said casing being filled with a rubber block or cushion 12 in which an externally splined bushing 13 is axially embedded. The rubber block or body 12 is preferably molded in position between the said bushing and casing, whereby a desirable degree of compression of the said rubber may be obtained, and it is also preferred that the surfaces of the bushing and casing be suitably treated in any of the manners well known to those conversant with the rubber molding art to ensure adherence of the rubber to the surrounding casing and internal bushing. It will thus be apparent that relative rotation of the casing and the bushing may only be effected against the torsional resistance of the rubber block or cushion 12.

The links or levers 4 and 7 are provided at their ends with shank portions 14 extending at right angles to the body or intermediate portions thereof and these shanks are inserted through the bushings 13 of the members 8 and 9, said links each also having at the junction of its shank with its body, laterally projecting lugs 15 which enter a recess or transverse slot 16 in a head 17 provided on each of said bushings, whereby rotary motion is imparted to said bushings by the angular, vertical or swinging movement of said links. The link structures 5 and 6 also have shanks 14 entering the bushings of the members 8 and are locked thereto by lugs 15 as in the case of the links 4 and 7, and are further drilled at 18 to permit the passage of the ends of shanks 14 therethrough for the reception of securing nuts 19. All of the shanks are so provided with securing nuts for preventing their withdrawal from the bushings.

The torsion members 8 and 9 are secured in suitable mountings on the frame and wheel structures to hold the said members in place and to prevent rotation of the casings 10 of the members with the bushings 13. The frame mountings are indicated as being of U-shaped sheet metal housings 20 through which the said members transversely extend, the said housings having openings therein for that purpose and being flanged at 21 for their attachment to the frame 1 by rivets 22. The said housings extend outwardly somewhat beyond the casings 10, the bent portion of the housing in each case accommodating a locking bolt 23 arcuately recessed at 24, as shown clearly in Figure 10, to engage the casing and provided with a nut 25 bearing on the upper part of the said housing whereby the said engagement with the casing is tightened to secure the desired locking of the casing against rotation.

The mountings 26 on the front wheel structures are shown, each in the form of a casting or forging having upper and lower cylindrical portions 27 and 28 embracing the casings of the members 9, the locking bolts 23 extending through horizontal bosses into engagement with the casings as described. The mountings 26 also have eye pieces 29 for their attachment to the spindles of the wheels.

The mountings 30, (see Figure 3) for the rear wheels, are each similar to the said mountings 26 except that they have a central orifice 31 therein for the accommodation of the live axle of the rear wheels and are provided with a bearing 32 therefor; and also in that the wheels are directly mounted thereon. The locking bolts 23 are, in this case, vertically arranged for convenience.

The mountings 26, therefore, constitute the spindle yokes for the front wheels, and the mountings 30, the spindle blocks upon which the rear wheels rotate, with the live axle shaft extending through said blocks and attached to said rear wheels to transmit driving torque thereto.

It is obvious that depression of the frame or elevation of the wheels due to road or other shocks will result in a change of angularity of the links from other normal rest position and incidentally cause the bushings, by virtue of their connection to the shanks of said links, to rotate within the rubber torque cushions. As the peripheries of the said rubber cushions are held against rotation by their casing embracing mountings the central portions of said torsion members or cushions are rotated relative to their peripheries and a torsional stress set up in the cushions building up a resistance increasing with the angular variation of the link.

It is a peculiar fact that rubber subjected to torsion under such conditions does not recover in direct inverse relation as the load is removed, but shows a marked tendency to lag, so that the reaction of the links is damped or slowed down in the manner much sought after in common spring suspension practice by the use of auxiliary shock absorbing devices.

As shown in Figures 1, 2 and 3, inclusive, the resilient suspension assemblies formed by the links and their connections may form the sole support for the frame of the vehicle, eliminating the necessity for the usual front and rear axles. Considering these suspension assemblies as a substitute for leaf springs and axles, it will be seen that a substantial saving in weight may be obtained in many types of vehicles and, incidentally, according to the design and nature of the vehicle, a saving in cost may, in many cases, be effected to a substantial degree.

The invention admits of its application and embodiment in innumerable ways according to the fancies of the designer, the requirements imposed by the particular installation or the nature of the device with which it is used; and in Figures 11, 12 and 13, inclusive, a rear wheel arrangement is shown having suspension links in three planes, one of which planes is that of the live axle. The spindle block 33 in this case has lateral enlarged portions 34 each forming the mounting for three rubber spring members 9 to which members are connected upper, intermediate and lower links or levers 6ª, 6ᵇ and 6ᶜ, and 7ª, 7ᵇ and 7ᶜ the inner ends of which are connected to spring members 8 in mountings 35 on the frame.

The rubber spring members are not necessarily at the ends of the links or levers. For instance, as shown in Figures 14 and 15, spring members 36 and 37 may be secured (as by their bushings 13) to links or levers 40 and 41 or 42 and 43 intermediate of their lengths, and may, in each case be used with other similar spring members at ends of the said links or levers. In Figure 14, spring members 8 are illustrated at the inner frame ends of the links 40 and 41, the outer ends of the said links being journalled in plain bushings 44 on the wheel structure, thus dispensing with spring members at this end. In Figure 15 the reverse arrangement is shown wherein the outer spring members 9 are used on the wheel structure and the inner ends of the links are journalled in plain bushings 45 on the frame. The casings 10 of the spring members 36 and 37 in both of these examples are secured against rotation with the bushings 13 thereof by an embracing strap 38 forming a vertical connecting link between the said upper and lower intermediate spring members 36 and 37.

Where a rear suspension arrangement such as that hereinbefore described is used, the rear live axle may comprise sections 46, 47 and 48 connected together by universal joints 49 and 50, and the brake drums may be conveniently arranged within the frame as indicated by 51 in Figures 1 and 3.

The rubber torsion spring member and link or lever combination is not limited to vehicles alone in its application as will be readily understood, as it may be used in a vast number of mechanisms and structures instead of coil or leaf springs where absorbing of vibration or spring action is desirable, but in its application to vehicles, and especially in the automobile art, many of the requirements of resilient suspension peculiar thereto and playing an important part in satisfactory design, are effectively met.

This invention may be developed within the scope of the following claims without departing from the essential features of the said invention, and it is desired that the specifications and drawings be read as being merely illustrative and not in a limiting sense, except as necessitated by the prior art.

What I claim is:—

1. In a wheel suspension, a longitudinal frame member and a wheel, said wheel carrying a torsional member composed of a casing, a member extending axially of said casing and a resilient substance between said member and said casing, and a link transversely extending from said frame member to said torsional member capable of exerting torsion on said resilient substance, said link being pivotally mounted on said frame member to oscillate in a plane transversely thereto.

2. In a wheel suspension, a longitudinal frame member and a wheel, a torsional member constituting a casing mounted on said frame member having an axial member extending therethru and a resilient substance between said axial member and said casing, and a transverse link connected to said torsional member, said link being swingably connected to said wheel for oscillation in a plane at right angles thereto.

3. In a wheel suspension, a frame member and a wheel, a torsional member mounted on said frame, a second torsional member mounted on said wheel and a rigid link connecting said torsional members to support said frame member.

4. In combination with the frame structure and wheel of a vehicle, a suspension means constituting a link extending from said frame structure to said wheel, said link having each of its ends terminating in operative engagement with a torsional member composed of a casing having an axial member therein and a resilient substance between said casing and said member whereby swinging of said link sets up torsion within said substance.

5. In combination, a longitudinal frame member having a casing mounted thereon and extending parallel thereto, an axial member extending thru said casing, a resilient substance maintaining said casing and said axial member in spaced parallel relation, a wheel in spaced relation from said frame member, a transverse link rigidly connected to said axial member and extending to said wheel and means for swingably connecting said link with said wheel.

6. In combination, a frame member and a wheel, torsional means constituting casings having axial members extending therethru and a resilient substance maintaining said casings and said axial members in spaced relation, said torsional means being mounted on said frame members and on said wheel respectively, said casings being disposed with their axes parallel to said frame member, and a link connecting the axial member of the torsional means on the frame member to the axial member of the torsional means on said wheel.

7. In combination, a frame member and a wheel, a plurality of torsional means constituting casings having a resilient substance therein and an axial member embedded in said resilient substance, said torsional means being mounted on said frame member with their axes in parallel relation to each other, a plurality of similar torsional means mounted on said wheel, and parallel links extending from said axial members of the torsional means on said frame to the axial members of the torsional means on said wheels to support said frame on said wheels.

8. In combination, a frame member and a wheel, a plurality of casings having a common axis mounted on said frame in parallel relation therewith, each of said casings containing an axial member spaced therefrom by a resilient substance, another casing having an axial member extending therethru and a resilient substance therein, the last said casing being mounted on said wheel, and links connecting the axial members of the casing on said frame member to the axial member of the casing on said wheel, the assembly thus providing a wheel suspension braced against forward displacement of the wheel with respect to said frame.

9. In combination with a vehicle frame and a wheel assembly including a journal member from which said frame is supported, a wheel supporting means including a rigid arm pivotally connected to the side rails of the frame and extending outwardly therefrom at an angle for pivotal connection to said journal member and a mass of rubber associated with said arm in rotatable relation for torsionally resisting relative vertical motion between said wheel and said frame.

10. In combination with a vehicle, a support therefor comprising a wheel and cushioning means individual to said wheel, the said cushioning means comprising a journal member for the wheel, an arm structure connecting said journal member with the vehicle and hinged to the latter to oscillate with relation thereto, and a torsional cushion structure adapted to resist such oscillation, said torsional cushion structure including an inner member and an outer member surrounding the inner member, the two thus defining an annular space radially between them, and a torsional cushion member operatively interposed between them in the said space said arm structure having for its oscillating movement bearing support at positions so widely spaced apart on an axis of its oscillating movement as alone effectively to resist movement of the journal member in a direction transverse to the arc of its oscillating movement.

11. In combination in a vehicle, a frame, two wheels in total disconnection from each other supporting one end of said frame, a torsion spring mounted on said frame at each side thereof, and an arm structure extending from each of said springs to one of said wheels, each of said arm structure being adapted to oscillate in a vertical arc during relative vertical movement of said wheel and said frame, each being supported at widely separated points on said frame as a brace against movement transverse to said vertical arcs.

12. In combination with a vehicle, a support therefor comprising a wheel and cushioning means individual to said wheel, the said cushioning means comprising a journal member for the wheel, an arm structure connecting said journal member with the vehicle and adapted to oscillate with relation to the latter in cushioning movement, and a torsional cushion structure adapted to resist such oscillation, said torsional cushion structure comprising an inner member and an outer member surrounding the inner member, the two thus defining an annular space radially between them, and a torsional cushion member operatively interposed between them in the said space, said arm structure having for its oscillating movement bearing support at positions so widely spaced apart on an axis of its oscillating movement as alone effectively to resist movement of the journal member in a direction transverse to the arc of its oscillating movement.

13. In combination in a vehicle, a frame having side rails, a wheel assembly including a journal member from which said frame is supported, an arm hingedly connected to said member and to said frame, and a torsional cushion structure by which said arm is connected to said frame, said arm being adapted to oscillate during relative vertical movement between said wheels and said frame to impose torsion in said structure, said cushion structure being tubular and having a diameter not greater than the depth of said side rails whereby a vehicle body may be lowered to the level of said frame directly above said structure.

14. In combination, a vehicle frame, a wheel assembly including a non-rotatable member for supporting the frame, an inherently rigid link extending laterally from said frame to said member, said link by its length and angularity with the siderails of the frame determining the lateral distance of said wheel from said frame, said link being pivotally connected to said member and to said frame to allow relative vertical movement therebetween, and a torsion resisting cushion associated with said link yieldably resisting such vertical movement.

15. In combination with a vehicle frame and a wheel from which said frame is supported, a plurality of vertically spaced horizontal links each pivotally connected to the frame and to the wheel, and torsional means for resisting the vertical movement of either end of said links with respect to the other end, said links with their pivotal connections constituting the sole means of support for said frame upon said wheels.

16. In combination, a vehicle frame, an individually sprung wheel assembly for supporting said frame, and a plurality of parallel rigid links of equal length each pivotally connected to said frame and to said wheel assembly, said links being in multiple vertically whereby said wheel always remains in fixed plane relationship with the horizontal, and a cushioning means individual to each of said links for yieldably resisting relative vertical movement between said wheel assembly and said frame.

17. In combination with a vehicle, a support therefor, comprising a wheel and cushioning means individual to said wheel, the said cushioning means comprising a journal member for the wheel, a parallel motion structure connecting said journal member for the wheel, a parallel motion structure connecting said journal member with the vehicle and adapted to oscillate with relation to the latter in cushioning movement, and a torsional cushion structure surrounding an axis of oscillation of said parallel motion structure and adapted to resist such oscillation.

18. In combination with a vehicle, a support therefor comprising a wheel and cushioning means individual to said wheel, the said cushioning means comprising a journal member for the wheel, a parallel motion structure connecting said journal member with the vehicle and adapted to oscillate with relation to the latter in cushioning movement, and a torsional cushion structure adapted to resist such oscillation, said torsional cushion structure comprising an inner member and an outer member surrounding the inner member, the two thus defining an annular space radially between them, and a torsional cushion member operatively interposed between them in the said space and surrounding an axis of oscillation of said parallel motion structure.

19. In combination with a vehicle, a support therefor comprising a wheel and cushioning means individual to said wheel, the said cushioning means comprising a journal member for the wheel, an arm structure connecting said journal member with the vehicle and adapted to oscillate with relation to the latter in cushioning movement, and a torsional cushion structure adapted to resist such oscillation, said torsional cushion structure comprising an inner member and an outer member surrounding the inner member, the two thus defining an anular space radially between them, and a torsional cushion member comprising rubber operatively interposed between them in the said space, and surrounding an axis of oscillation of said arm structure, said arm structure having for its oscillating movement bearing support at positions so widely spaced apart on an axis of its oscillating movement as alone effectively to resist movement of the journal member in a direction transverse to the arc of its oscillating movement.

20. In combination with a vehicle, a support therefor comprising a wheel and cushioning means individual to said wheel, the said cushioning means comprising a journal member for the wheel, a parallel motion structure connecting said journal member with the vehicle and adapted to oscillate with relation to the latter in cushioning movement, and a cushion structure comprising rubber surrounding an axis of oscillation of said parallel motion structure and adapted to resist such oscillation.

21. In combination with a vehicle, a support therefor comprising a wheel and cushioning means individual to said wheel, the said cushioning means comprising a journal member for the wheel, a parallel motion structure connecting said journal member with the vehicle and adapted to oscillate with relation to the latter in cushioning movement, and a torsional cushion structure adapted to resist such oscillation, said torsional cushion structure comprising an inner member and an outer member surrounding the inner member, the two thus defining an annular space radially between them, and a torsional cushion member comprising rubber operatively interposed between them in said space and surrounding an axis of oscillation of said parallel motion structure.

22. In combination with a vehicle frame and a wheel assembly including a journal member from which said frame is supported, a plurality of rigid links each pivotally connected to the frame and to the journal member, each of said links having at least one end thereof engaging a mass of rubber constituting a pivotal support therefor whereby torsion may be imposed on said rubber thereby, each of said arms being adapted to swing in an arc transverse to the side rails of said frame.

23. In combination with a vehicle frame and a wheel assembly including a journal member from which said frame is supported, a plurality of arms each pivotally connected to the journal member and to the frame, at least one of said arms residing above a horizontal plane containing the axis of the wheel, another of said arms residing below said plane, each of said arms at one end thereof being connected to a mass of rubber, said rubber constituting a torsion resisting means opposing vertical motion between said wheel and said frame.

24. In combination with a vehicle frame and a wheel assembly including a journal member from which said frame is supported, a plurality of arms connected at their ends to the frame and to the journal member respectively, one of said arms residing above a horizontal plane containing the axis of the wheel, another of said arms residing below said plane, and a rubber mounting supported on the frame for one end of each of said arms said mounting constituting a torsion resisting pivot resisting relative vertical motion between said wheel and said frame.

25. In combination, a vehicle frame, a wheel assembly including a non-rotatable member for supporting said frame, a plurality of vertically spaced links of inherent rigidity extending from said member to said frame, each of said links being pivotally supported at each end, a housing at one end of each member for cooperative engagement therewith, said housing containing rubber to yieldably resist vertical displacement of said wheel with respect to said frame, said links being of equal length whereby said wheel constantly remains in fixed angular relationship with the ground.

26. In combination with the frame structure and a wheel structure of a vehicle, suspension means including a link having vertical swinging connection between said frame and wheel structure, and torsional resisting bodies mounted on said frame structure and said wheel structure respectively, each of said bodies having a center body engaging means and an outer body engaging means, one of which means in each case is connected with said link for torsional movement thereby and the other of which means is held against movement under torsional strains.

27. In combination with the frame structure and a wheel structure of a vehicle, suspension means including a link having vertical swinging connection between said frame and wheel structure, and torsional springs comprising rubber cushions each having center and outer engaging means mounted on said frame structure and on said wheel structure, one of which means is connected in each case with the said link for rotation thereby and the other is held against rotation by said frame structure or the said wheel structure.

28. In combination, a wheel assembly, a vehicle frame having two torsional springs mounted thereon opposite said wheel assembly, one of said springs residing above a horizontal plane containing the axis of the wheel of said assembly, the other of said springs residing below said plane, a suspensory lever extending from each of said springs for pivotal connection to said wheel assembly, said wheel assembly being competent to steer.

29. In combination in a vehicle, an individually sprung wheel assembly, a frame, a torsional spring including rubber secured to said frame, and a suspensory lever connecting said wheel assembly with said spring, said rubber being supported by said frame at widely spaced points whereby swinging of said suspensory lever must occur in an arc contained by a plane having a fixed relative position with respect to said frame.

30. In a vehicle running gear including a frame and vehicle wheels, a frame, a plurality of wheels from which said frame is supported, a parallel motion structure composed of rigid members supporting said wheels from said frame, and torsional springs constituting hinges for at least two vertices of the parallelogram connected to said frame, said wheels and a portion of said parallel motion structure constituting the entire unsprung weight of said running gear.

WARREN NOBLE.